US009043619B2

(12) United States Patent
Lee et al.

(10) Patent No.: US 9,043,619 B2
(45) Date of Patent: May 26, 2015

(54) METHOD AND APPARATUS FOR POWER MANAGEMENT ACCORDING TO A SITUATION MODE

(75) Inventors: Yun-Hsien Lee, Kaohsiung (TW); Chin-Jung Chang, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 271 days.

(21) Appl. No.: 13/527,442

(22) Filed: Jun. 19, 2012

(65) Prior Publication Data

US 2013/0339764 A1  Dec. 19, 2013

(51) Int. Cl.
*G06F 1/32* (2006.01)

(52) U.S. Cl.
CPC .............. *G06F 1/3206* (2013.01); *G06F 1/325* (2013.01); *G06F 1/3287* (2013.01); *Y02B 60/1282* (2013.01)

(58) Field of Classification Search
CPC ....... G06F 1/3203; G06F 1/26; G06F 1/3296; G06F 1/325; G06F 1/3287; G06F 1/3206; H04W 52/0254; Y02B 60/1282
USPC .......................................................... 713/300
See application file for complete search history.

(56) References Cited

U.S. PATENT DOCUMENTS

| 4,395,697 | A | * | 7/1983 | Dargel et al. | 382/303 |
| 4,395,698 | A | * | 7/1983 | Sternberg et al. | 382/308 |
| 4,395,700 | A | * | 7/1983 | McCubbrey et al. | 382/303 |
| 4,398,176 | A | * | 8/1983 | Dargel et al. | 382/303 |
| 4,484,346 | A | * | 11/1984 | Sternberg et al. | 382/303 |
| 5,822,597 | A | * | 10/1998 | Kawano et al. | 713/323 |
| 6,094,702 | A | * | 7/2000 | Williams et al. | 711/101 |
| 6,122,960 | A | * | 9/2000 | Hutchings et al. | 73/493 |
| 6,289,399 | B1 | | 9/2001 | Furuichi et al. | |
| 6,856,934 | B2 | * | 2/2005 | Vock et al. | 702/149 |
| 7,100,020 | B1 | * | 8/2006 | Brightman et al. | 712/18 |
| 7,353,413 | B2 | * | 4/2008 | Dunstan | 713/320 |
| 2003/0005341 | A1 | * | 1/2003 | Terunuma | 713/310 |

(Continued)

FOREIGN PATENT DOCUMENTS

| DE | 69529129 T2 | 4/2003 |
| TW | 200921344 | 5/2009 |

(Continued)

OTHER PUBLICATIONS

Germany Patent Office, Office Action, Patent Application No. 10 2012 105 711.7, Jul. 30, 2012, Germany.

*Primary Examiner* — Thomas Lee
*Assistant Examiner* — Danny Chan

(57) ABSTRACT

The disclosure discloses a power management method, for setting a power supply arrangement of an electronic device intelligently, comprising providing at least two sensors, corresponding to at least one threshold respectively; detecting a state of the electronic device for generating a detecting signal respectively; comparing the at least two detecting signals with the at least one threshold corresponding to the at least two sensors respectively; generating at least two situation signals when the at least two detecting signals meet the at least one threshold corresponding to the at least two sensors respectively; looking up a look-up table according to the at least two detecting signals for generating a control command; and writing in at least one independent bit of a register according to the control command for changing or maintaining a power supply arrangement of at least one peripheral component.

14 Claims, 11 Drawing Sheets

(56) References Cited

U.S. PATENT DOCUMENTS

| | | | |
|---|---|---|---|
| 2005/0021292 A1* | 1/2005 | Vock et al. | 702/182 |
| 2008/0091965 A1* | 4/2008 | Nychka et al. | 713/323 |
| 2008/0161072 A1* | 7/2008 | Lide et al. | 455/574 |
| 2008/0254822 A1* | 10/2008 | Tilley | 455/550.1 |
| 2010/0001949 A1* | 1/2010 | Shkolnikov et al. | 345/156 |
| 2012/0096290 A1* | 4/2012 | Shkolnikov et al. | 713/320 |
| 2012/0151432 A1* | 6/2012 | Long et al. | 717/100 |
| 2013/0210407 A1* | 8/2013 | Avadhanam | 455/418 |

FOREIGN PATENT DOCUMENTS

| | | |
|---|---|---|
| TW | 200923636 | 6/2009 |
| TW | 201001153 | 1/2010 |
| TW | 201115319 | 5/2011 |

* cited by examiner

METHOD AND APPARATUS FOR POWER MANAGEMENT ACCORDING TO A SITUATION MODE

BACKGROUND

1. Technical Field

The disclosure relates to a method and apparatus for power management, and in particular, to a method and apparatus for power management having a sensor.

2. Related Art

With the development and popularization of modern portable electronic device, electricity consumption of the portable electronic device becomes the main criterion. How to achieve the balance between the performance and energy efficiency of the portable electronic device is the problem that manufacturer is dedicated to solve.

In order to achieve the above-mentioned balance, adjusting different power management modes of the portable electronic device according to different usage states is main electricity saving way so far. Take laptop as an example, a user may set a plurality of performance managements in the laptop according to actual user requirement. When the user only needs to do assignments with low-power requirement, such as word processing, the user may switch the laptop to a low-performance management for decreasing electricity consumption. On the contrary, when the user needs to do assignments with high-power requirement, such as graphics processing, the user may switch the laptop to a high-performance management for reaching the actual requirement.

Moreover, the portable electronic device may have a plurality of operation modes. For example, the portable electronic device may be disposed on a desk or be hand held by the user. When the portable electronic device is in different operation modes, the portable electronic device may use different kinds of peripheral components, but electronic components enabled in the portable electronic device may not fit the corresponding operation modes, thereby still consuming unnecessary electricity of the portable electronic device.

Therefore, the manufacturer develops a power management method that a user may directly control a power supply of a peripheral component or an electronic component. But in this manner, the user still needs to control the power supply of the specific electronic component manually.

SUMMARY

An embodiment discloses a power management method, for setting a power supply arrangement of an electronic device, comprising providing at least two sensors corresponding to at least one threshold respectively; detecting a state electronic device for generating a detecting signal respectively; comparing the at least two detecting signals with the at least one threshold corresponding to the at least two sensors respectively; generating at least two situation signals when the at least two detecting signals meet the at least one threshold corresponding to the at least two sensors respectively; looking up a look-up table according to the at least two detecting signals for generating a control command; and writing in at least one independent bit of a register according to the control command for changing or maintaining a power supply arrangement of at least one peripheral component.

An embodiment discloses an electronic device having at least two sensors, wherein the at least two sensors are used for detecting a state and generating at least two detecting signals. The electronic device comprises at least one peripheral component and a control module. The control module is electrically connected to the at least one peripheral component and the at least two sensors, wherein the control module comprises a register, the control module is used for receiving the at least two detecting signals and looking up a look-up table according to the at least two detecting signals to generate a control command, and the control module writes in the register according to the control command for changing or maintaining a power supply arrangement of the at least one peripheral component.

An embodiment discloses an electronic device having at least one sensor, wherein the at least one sensor is used for detecting a state and generating at least one detecting signal. The electronic device comprises at least one peripheral component and a control module. The control module is electrically connected to the at least one peripheral component and the at least one sensor, wherein the control module comprises a register, the control module is used for receiving the at least one detecting signal and looking up a look-up table according to the at least one detecting signal to generate a control command, and the control module writes in the register according to the control command for changing or maintaining a power supply arrangement of the at least one peripheral component.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

A method and apparatus for power management according to an embodiment are applicable to a portable electronic device. When the usage state of the portable electronic device is changed, the power supply arrangement is changed or maintained intelligently without manual control.

In the following embodiments, 'states' mean that the electronic device has different kinds of external environmental conditions according to the interaction between the electronic device and a user. For example, when the user uses the electronic device which is on the desk, the electronic device is determined in a 'still state' automatically; when the user uses the electronic device in a handheld way, the electronic device is determined in a 'handheld use state'; when the user does not use the electronic device, the electronic device is determined in an 'off state' automatically. When the electronic device detects the current state in which the electronic is, the electronic device automatically determines a specific 'situation mode' corresponding to the state and enters the situation mode. The electronic device changes or maintains the power supply arrangement of peripheral components and the performance management of electronic components according to the current situation mode.

Figure 1:
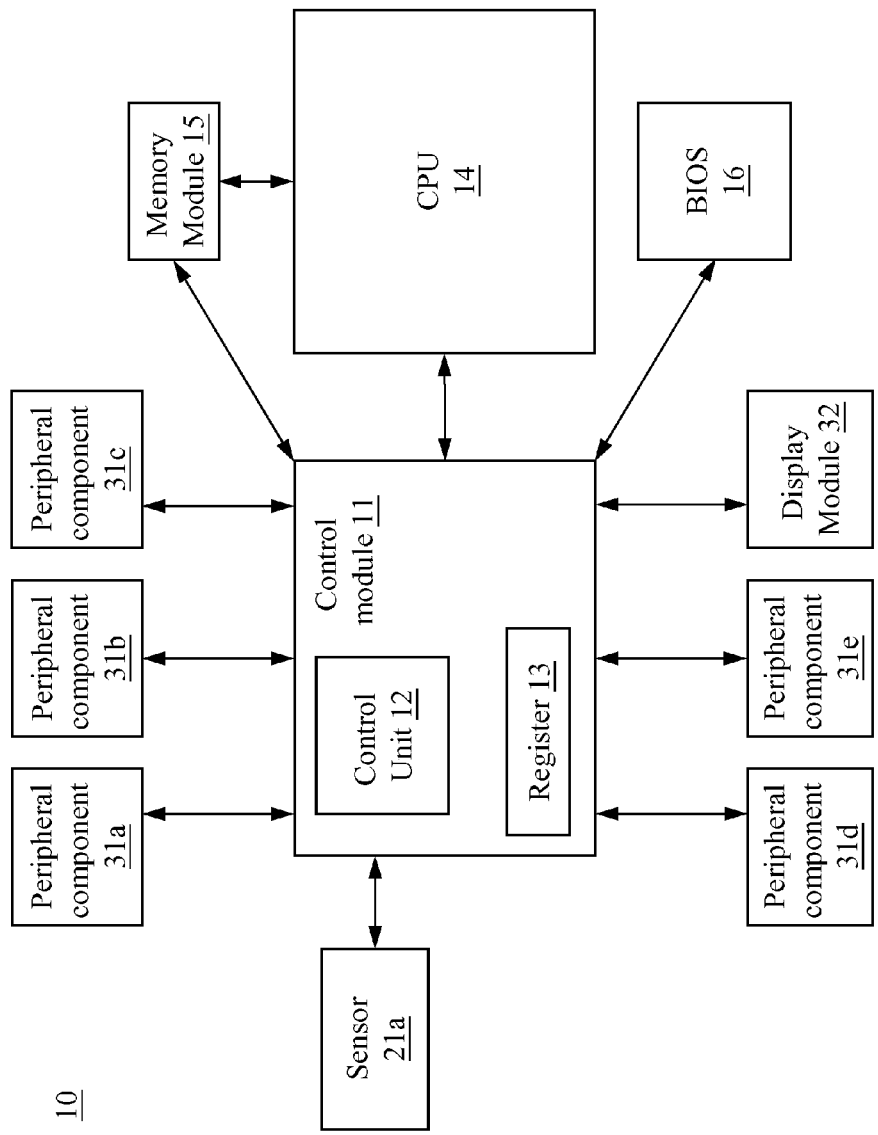
FIG. 1 is a schematic view of an electronic device according to first embodiment.

The following describes an electronic device in a first embodiment. Please refer to FIG. 1. FIG. 1 is a schematic view of an electronic device according to first embodiment.

An electronic device 10 according to this embodiment comprises a control module 11, a central processing unit (CPU) 14, a memory module 15, a basic input-output system (BIOS) 16, a sensor 21a, peripheral components 31a, 31b, 31c, 31d, 31e (for brief description, the following are collectively referred to as peripheral components 31) and a display module 32. In this embodiment, the electronic device 10 is a tablet computer. The peripheral component 31a is a web camera (webcam). The peripheral component 31b is an internal local area network (internal LAN). The peripheral component 31c is an interface connector, i.e. a Universal Serial Bus port (USB port). But the above-mentioned hardware modules are not limited to the embodiment. For example, the electronic device 10 is the portable electronic device, i.e. a mobile phone, a smart phone, a laptop computer, a Personal Digital Assistant (PDA), a tablet computer, a handheld gaming device or a portable music player. A power management method of the electronic device 10 may be implemented through the above-mentioned modules and components of the electronic device 10. Because the electronic device 10 is a portable electronic device (i.e. the laptop computer in this embodiment), the electronic device 10 may be operated in different kinds of states. For example, in general use, when a user disposes and uses the electronic device 10 on the desk, the electronic device 10 is defined as 'still state'. Otherwise, in other embodiments, when the user uses the electronic device in a handheld way, the electronic device 10 is defined as 'handheld state'. When the electronic device 10 is not in use, the electronic device 10 is defined as 'off state'. Therefore, the electronic device 10 may intelligently adjust the power supply arrangement or performance management of the peripheral components 31 or other components according to the current state of the electronic device 10. That is, the limited power resource is provided to the peripheral components 31 or other components which need power necessarily, thereby achieving the effects of humanized operation, power saving and high efficiency.

The following specifically describes each module and component of the electronic device 10. The sensor 21a is electrically connected to the control module 11. The sensor 21a is used for detecting a state outside and generating a detecting signal after the detection. For example, the sensor 21a may be a gravity sensor (G-sensor or accelerometer), a thermal sensor, a gyroscope, a proximity sensor, a sound sensor, an altitude sensor, a motion sensor, a light sensor or a pressure sensor. For example, when the sensor 21a is the G-sensor for measuring an instant acceleration of the portable electronic device 10, it is beneficial for the control of the electronic device 10 in a specific state. In other words, when the portable electronic device 10 is moved, an acceleration of a specific direction of the moving is measured and a detecting signal is generated by the G-sensor. The detecting signal is used for informing the control module 11 that the electronic device 10 is performed an accelerative movement.

The peripheral components 31 are electrically connected to the control module 11. The main function of the peripheral components 31 is to provide the electronic device 10 inputting or outputting function. Otherwise, the peripheral components 31 may be used for providing other functions of the electronic device 10. For example, the peripheral components 31 may be a storage device for storing, loading and writing in information (or the peripheral components 31 may be connected to a storage device for storing, loading and writing in information). The peripheral components 31 may be an internal LAN for connecting the outside internet or may be coupled to a printer for transmitting information. But the above-mentioned functions of the peripheral components 31 are not limited to the embodiment. For example, in other embodiments, the peripheral components 31 may be a webcam, a touch panel module, a heat dissipation module, a processor frequency control module, an audio module, an audio-in module or a Bluetooth® module.

Moreover, the CPU 14 is electrically connected to the control module 11 and the memory module 15. The BIOS 16 is electrically connected to the control module 11. The CPU 14 is the main part of the electronic device 10 to perform data processing.

In this embodiment, the control module 11 receives and determines the detecting signal of the sensor 21a for controlling the power supply arrangement or performance management of the peripheral components 31, the display module 32 and the CPU 14. The control module 11 comprises a control unit 12 and a register 13. The register 13 comprises a plurality of independent bits and each of the independent bits corresponds to the power supply arrangement or performance management of the peripheral components 31, the display module 32 and the CPU 14 respectively. For example, the peripheral component 31a is a built-in webcam, when the independent bit corresponding to the peripheral component 31a is set as '0', the control module 11 shuts down the power of the webcam; when the independent bit corresponding to the peripheral component 31a is set as '1', the control module 11 turns on the webcam. In addition, each of the independent bits may be controlled separately. In other words, each of the independent bits corresponds to the independent and specific power supply arrangement or performance management of the peripheral components 31, the display module 32 and the CPU 14 respectively. The memory module 15 is used for storing a plurality of thresholds and a look-up table. Each of the thresholds is a preset condition value or a user-setting condition value. The content of the threshold may be taken as a determination of accidental touch, that of current state, or the influence of the environment, thereby increasing the reliability of the sensor 21a. The threshold is used for comparing with the detecting signal generated by the sensor 21a. When the detecting signal meets the corresponding threshold, indicating the change of the detecting signal is confirmed, the control module generates a situation signal according to the changed detecting signal. Then, the control module 11 looks up a look-up table. The look-up table comprises a plurality of situation modes corresponding to a combination of different values of the independent bits respectively. When the situation signal meets the specific situation value, the control unit 12 generates a control command for writing in the independent bits of the register 13. Afterwards, the power supply arrangement or performance management of the peripheral components 31, the display modules 32 and the CPU 14 is changed according to the independent bits written in by the control command.

Figure 2:
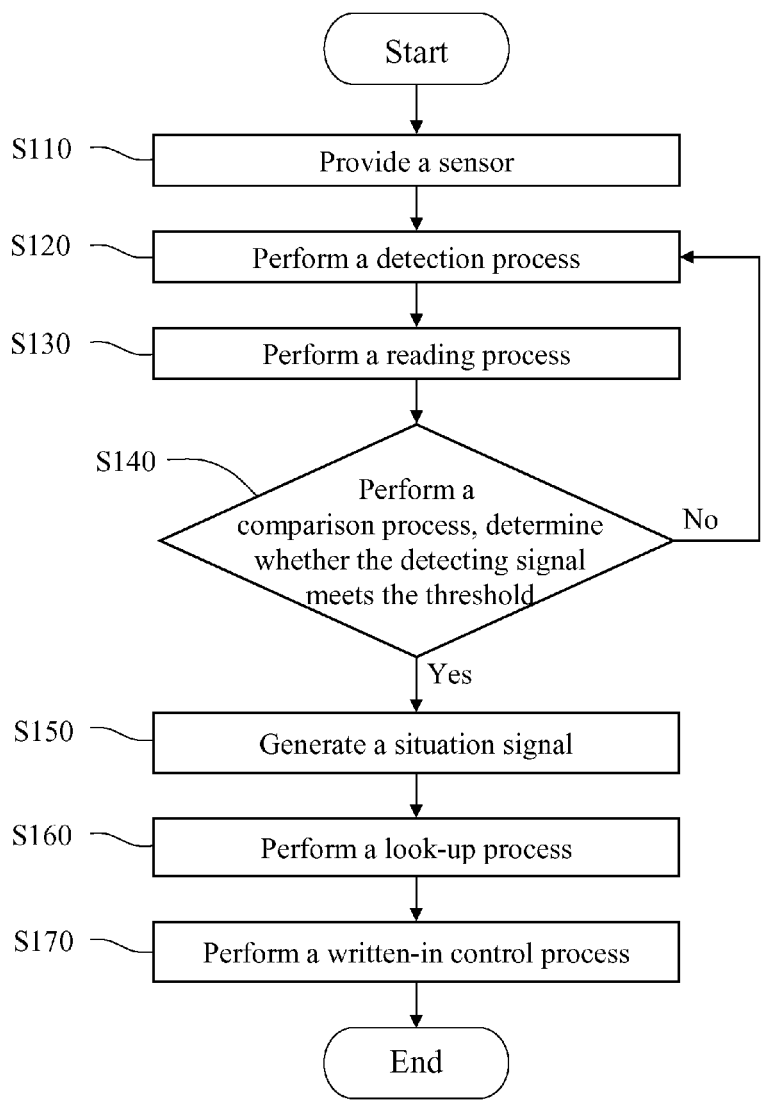
FIG. 2 is a flow chart of a power management method of the electronic device according to first embodiment.

In order to intelligently set the power supply arrangement of the peripheral components 31, the performance management of the display modules 32 and that of the CPU 14, the following describes a power management method of the electronic device 10. Please refer to FIG. 1 and FIG. 2, FIG. 2 is a flow chart of a power management method of the electronic device according to first embodiment.

First, a plurality of situation modes (i.e. a 'handheld situation mode' and an 'off situation mode'), a control condition (a threshold) and states of a plurality of peripheral components 31 in each situation mode may be set by a user in advance. By detecting a change of a current state of an electronic device 10 by a sensor 21, the power supply of the peripheral components 31 is controlled and adjusted automatically.

A sensor 21a is provided in the electronic device 10 (Step 110). The sensor 21a is electrically connected to a control module 11. Then, a detection process is performed. When the state is changed, the sensor 21a detects the changed state and generates a detecting signal (Step 120). Under the circumstances, the sensor 21a of the electronic device 10 detects the external state in a preset frequency. When the sensor 21a detects the state is changed, the sensor 21a generates a corresponding detecting signal and transmits the detecting signal to a control unit 12 of the control module 11. In this embodiment, the electronic device 10 is a laptop computer and the sensor 21a is a pressure sensor disposed on a shell of the electronic device 10. The sensor 21a is at a position where the user may touch the sensor 21a when the user uses the electronic device 10 in the handheld way. When the user holds the electronic device 10 by hands, the user may press the sensor 21a (the pressure sensor). The sensor 21a detects the press by the user and the sensor 21a generates the detecting signal and transmits the detecting signal to the control unit 12 of the control module 11. On the contrary, when the user does not use the electronic device 10, the user may not press the sensor 21a. Therefore, the sensor 21a generates another detecting signal indicating there is 'no press' on the sensor 21a. For example, when the electronic device 10 is disposed on a desk, the sensor 21a generates the 'no press' detecting signal, therefore, the electronic device 10 is in the 'off state'. After that, when the electronic device is picked up from the desk and operated by the user, the sensor 21a is pressed by the user. The sensor 21a generates the 'pressed' detecting signal, so the electronic device 10 is switched from the 'off situation mode' to the 'handheld situation mode' intelligently.

Otherwise, in this embodiment, the user may manually set demand for sampling selection of the sensor 21a to increase the determination frequency of the control module 11, thereby increasing or decreasing the determination speed of the electronic device 10.

After that, a reading process is performed (Step 130). The control unit 12 reads the threshold. In this embodiment, the threshold is stored in the memory module 15. The threshold may be transmitted to the control unit 12 in advance or after the control unit 12 receives the detecting signal, the threshold may be transmitted to the control unit 12 from the memory module 15, but the above-mentioned transmittance ways of the threshold are not limited to the embodiment. Afterwards, a comparison process is performed. Compare the detecting signal with the threshold to determine whether the detecting signal meets the threshold (Step 140). In this embodiment, the threshold may be set as a pressure value. For example, the electronic device 10 is entered the 'off situation mode' at first, that is the 'no press' detecting signal is generated by the sensor 21a originally. When the pressure value of the detecting signal is greater than the threshold, it means the detecting signal meets the threshold and it defines the sensor 21a is pressed. On the contrary, when the pressure value of the detecting signal is equal to or less than the threshold, it means the detecting signal does not meet the threshold and defines the sensor 21a is not pressed. The threshold is a preset condition value or a user-setting condition value and may be a determination of accidental touch, current state or other self definition by the user. In this embodiment, the detectable pressure value detected by the pressure sensor may be range from '0' to '10'. '0' is the minimum pressure value and '10' is the maximum pressure value. For example, when the accidental touch is the determination standard, the threshold may be set as '3'. When the detecting signal is larger than '3', it defines that the sensor 21a is pressed, so the detecting signal meets the threshold.

When the detecting signal does not meet the threshold, return to Step 120 and repeat the above-mentioned steps.

When the detecting signal meets the threshold, a situation signal is generated according to the comparison of the detecting signal (Step 150). In this embodiment, the electronic device 10 is entered the 'off situation mode' at first, then the pressure value of the detecting signal is greater than the set pressure value of the threshold, it means that the detecting signal meets the limitation of the threshold and the situation signal is generated by the control unit 12. In this embodiment, the situation signal may be set as '0' or '1'. '0' indicates the sensor 21a is not pressed and '1' indicates the sensor 21a is pressed.

Afterwards, a look-up process is performed. A look-up table is looked up according to the situation signal for generating a control command (Step 160). In this embodiment, the look-up table is stored in the memory module 15 and may be transmitted to the control module 11 for preparing to be looked up in advance. When the situation signal performs looking up the look-up table and the detecting signal meets a specific situation mode of the look-up table, a control command is generated and a written-in control process is performed (Step 170). In this embodiment, the situation modes include an 'off situation mode' and a 'handheld situation mode'. '0' and '1' may be written in the independent bits corresponding to the situation mode by the control command. '0' represents 'shut down' and '1' represents 'power on'. The power supply arrangement of the peripheral components 31 and that of the display module 32 are adjusted or maintained according to the values of the corresponding independent bits respectively.

The power supply arrangement of the peripheral components 31 and that of the display module 32 in each situation mode are as shown in Table 1-1 below.

TABLE 1-1

|  | Off situation mode | Handheld situation mode |
|---|---|---|
| Webcam (peripheral component 31a) | shut down | shut down |
| Internal LAN (peripheral component 31b) | shut down | power on |
| Wireless LAN (peripheral component 31c) | power on | power on |
| Touch panel module (peripheral component 31d) | shut down | power on |
| Interface connector (peripheral component 31e) | power on | power on |
| Display module 32 | shut down | power on |

For example, when the control unit 12 looks up the look-up table and the situation signal meets the 'handheld situation mode', the electronic device 10 is switched and is entered the 'handheld situation mode' and the control command is written in the independent bits of the register 13. Then, the power supply arrangement and/or the performance management are/is adjusted or maintained according to the values of the independent bits. At this time, because the command unit determines that the user holds the electronic device 10 by hands, the control module 11 may automatically adjust the power supply arrangement of the peripheral components 31 (As shown in Table 1-1, the 'handheld situation mode' is to turn on the internal LAN (the peripheral component 31b), the wireless LAN (the peripheral component 31c), the touch panel module (the peripheral component 31d), and the display module 32 (power-on) and shut down the webcam (the peripheral component 31a)) so that limited power energy of the electronic device 10 is intelligently adjusted and is supplied to the needed peripheral components 31 according to the current state.

Figure 3:
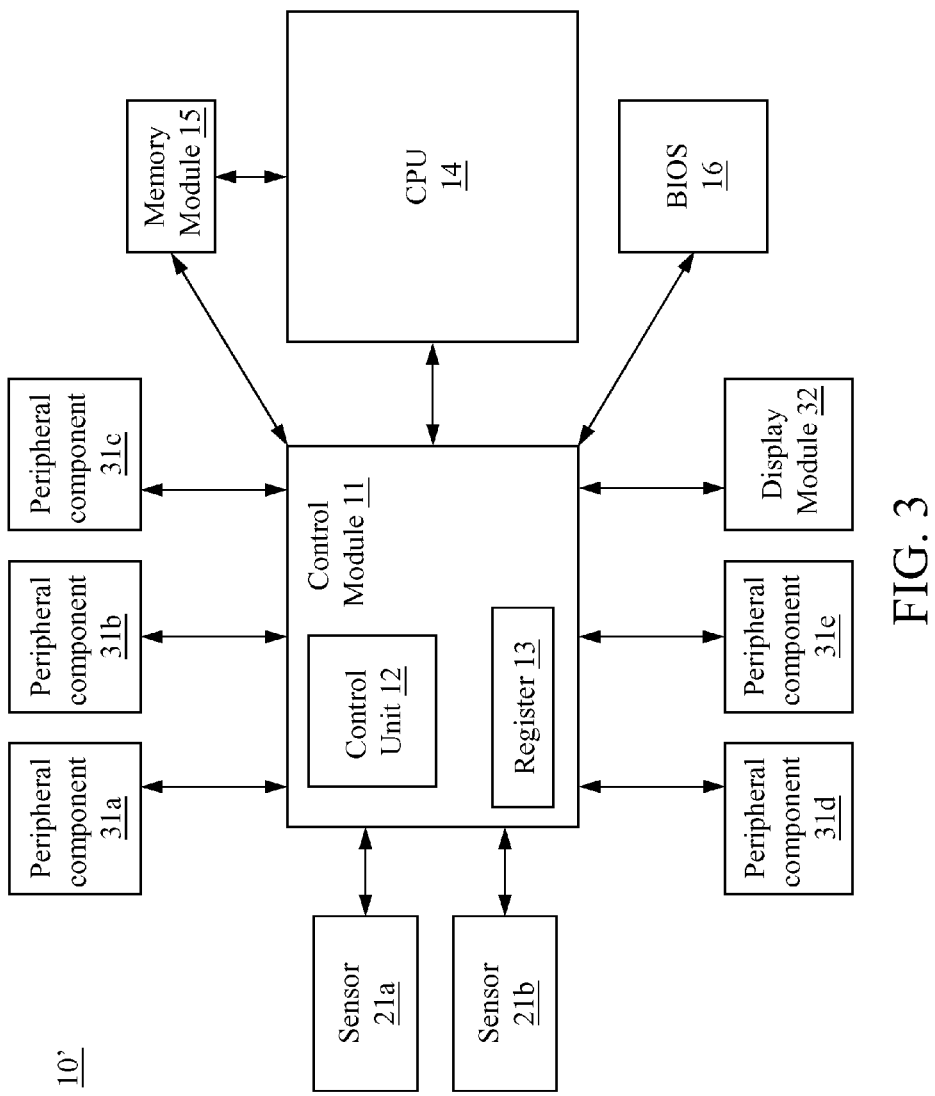
FIG. 3 is a schematic view of an electronic device according to second embodiment.

The electronic device 10 in the above-mentioned first embodiment comprises only one sensor 21a. In other embodiments, the electronic device may comprise a plurality of sensors. The following describes an electronic device having a plurality of sensors in other embodiment. Please refer to FIG. 3, which is a schematic view of an electronic device according to second embodiment. The elements in FIG. 3 are the same as those in FIG. 1, so that the elements with the same symbols have the same functions or structures. For the sake of conciseness, only the differences are illustrated below, and the similar parts will not be repeated herein. The main difference between the electronic device 10 in FIG. 1 and an electronic device 10' in FIG. 3 is that the electronic device 10' further comprises a sensor 21b. In other words, the electronic device 10' comprises two sensor 21a, 21b (for brief description, the following are collectively referred to as sensors 21). Therefore, the control module 11 may determine the state of the electronic device 10' according to a plurality of detecting signals transmitted from the sensors 21 together. In this embodiment, the sensor 21a is a pressure sensor and the sensor 21b is a G-sensor. In this embodiment, situation modes of the electronic device 10' include a 'handheld situation mode', a 'still situation mode' and an 'off situation mode', but not limited to the embodiment. In other embodiments, the electronic device 10' may include more than two situation modes.

Figure 4:
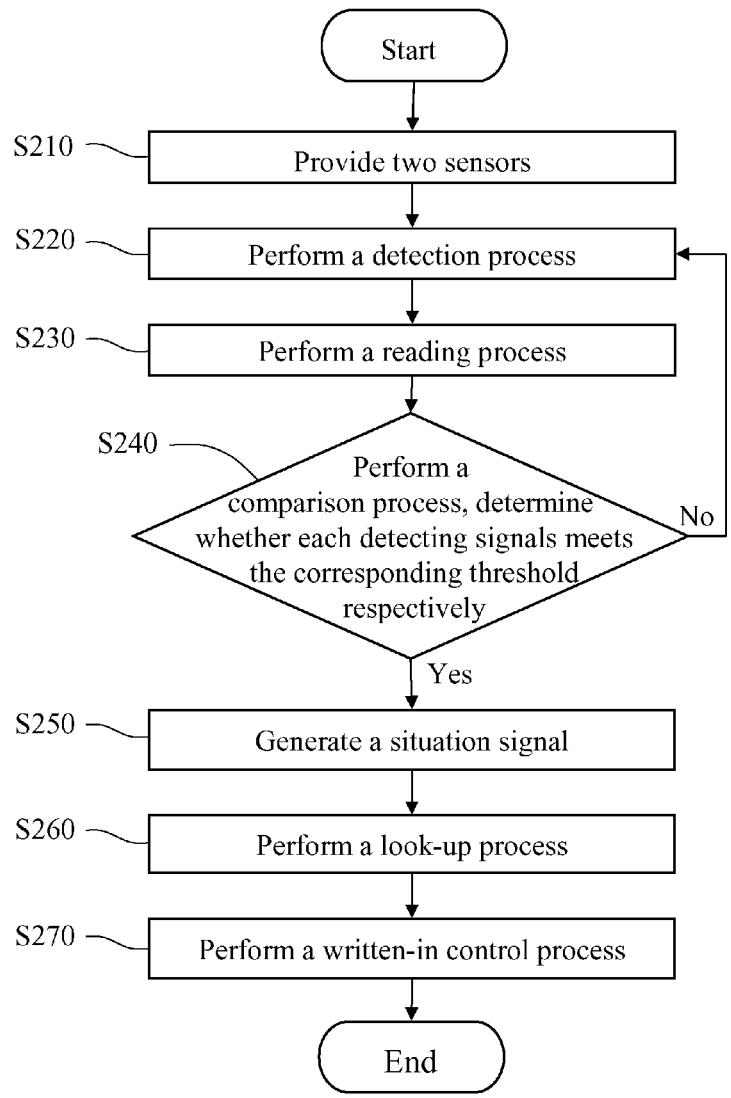
FIG. 4 is a flow chart of a power management method of the electronic device according to second embodiment.

The following describes a power management method of the electronic device 10' having the two sensors 21. Please refer to FIG. 3 and FIG. 4, FIG. 4 is a flow chart of a power management method of the electronic device according to second embodiment. First, two sensors 21 are provided in an electronic device 10' (Step 210). Then, a detection process is performed. When a current state of the electronic device 10' is changed, the two sensors 21 detect the state together to generate a detecting signal respectively (Step 220). After that, a reading process is performed (Step 230), a control unit 12 reads two threshold corresponding to the two sensors 21 respectively. Afterwards, a comparison process is performed. The two detecting signals are compared with the corresponding threshold to determine whether each of the detecting signals meet the corresponding threshold respectively (Step 240). When one of the detecting signals does not meet the corresponding thresholds, return to the Step 220 and repeat the above-mentioned steps. When the detecting signals meet the corresponding thresholds, a situation signal is generated (Step 250). Then, a look-up process is performed. A look-up table is looked up according to the situation signal to generate a control command (Step 260).

The content of each state of the corresponding look-up table looked up by the detecting signal is as shown in Table 2-1 below.

TABLE 2-1

|  | Handheld state | Still state | Off state |
|---|---|---|---|
| Pressure sensor (sensor 21a) | Point pressure generated | Point pressure generated | No pressure |
| G-sensor (sensor 21b) | Movement in one direction | No acceleration | No definition |

The content of the above-mentioned table is only for description, but is not limited to the embodiment and is adjusted according to actual requirement. In this embodiment, after the control command is generated, a written-in control process is performed (Step 270). The control unit 12 changes or maintains the power supply arrangement of peripheral components 31 or the performance management of a display module 32 or that of a CPU 14 according to independent bits of a register 13 written by the control command. In this embodiment, the brightness of the display module 32 and the frequency of the CPU 14 may be both adjusted by the control command.

The content of the power supply arrangement of the peripheral components 31, the performance management of the display module 32 and that of the CPU 14 in each situation mode is as shown in Table 2-2 below.

TABLE 2-2

|  | Handheld situation mode | Still situation mode | Off situation mode |
|---|---|---|---|
| Webcam (peripheral component 31a) | shut down | power on | shut down |
| Internal LAN (peripheral component 31b) | shut down | power on | shut down |
| Wireless LAN (peripheral component 31c) | power on | shut down | shut down |
| Touch panel module (peripheral component 31d) | power on | power on | shut down |
| Interface connector (peripheral component 31e) | power on | power on | power on |
| Display module 32 | Brightness 2 | Brightness 1 | Brightness 1 |
| CPU 14 | Performance 2 | Performance 2 | Performance 1 |

The content of the above-mentioned table is only for description, but is not limited to the embodiment and is adjusted according to actual requirement. For example, when the control unit 12 looks up the look-up table and the situation signal meets the 'handheld situation mode', the control command writes in the independent bits of the register 13. The power supply arrangement and the performance management are adjusted or maintained according to the values of the independent bits. At this time, the control unit 12 determines that the electronic device 10' is in the 'handheld state'. That is, the user uses the electronic device 10' in a handheld way, so the control module 11 may automatically make the electronic device 10' enter the 'handheld situation mode' and adjust the power supply arrangement of the peripheral components 31, the performance management of the display module 32 and that of the CPU 14 according to the values of the independent bits corresponding to the 'handheld situation mode'.

By implementing the above-mentioned steps, the electronic device 10' having the multiple sensors detects the current state with the limitation of the thresholds, so the control module 11 can determine the situation mode of the electronic device more accurately. Therefore, the accidental touches by the user or the influence of the environment which leads to misjudgment is avoided. Otherwise, the limited power of the electronic device 10' of this embodiment is intelligently saved and the detection reliability is increased because of the disposition of the multiple sensors.

Figure 5:
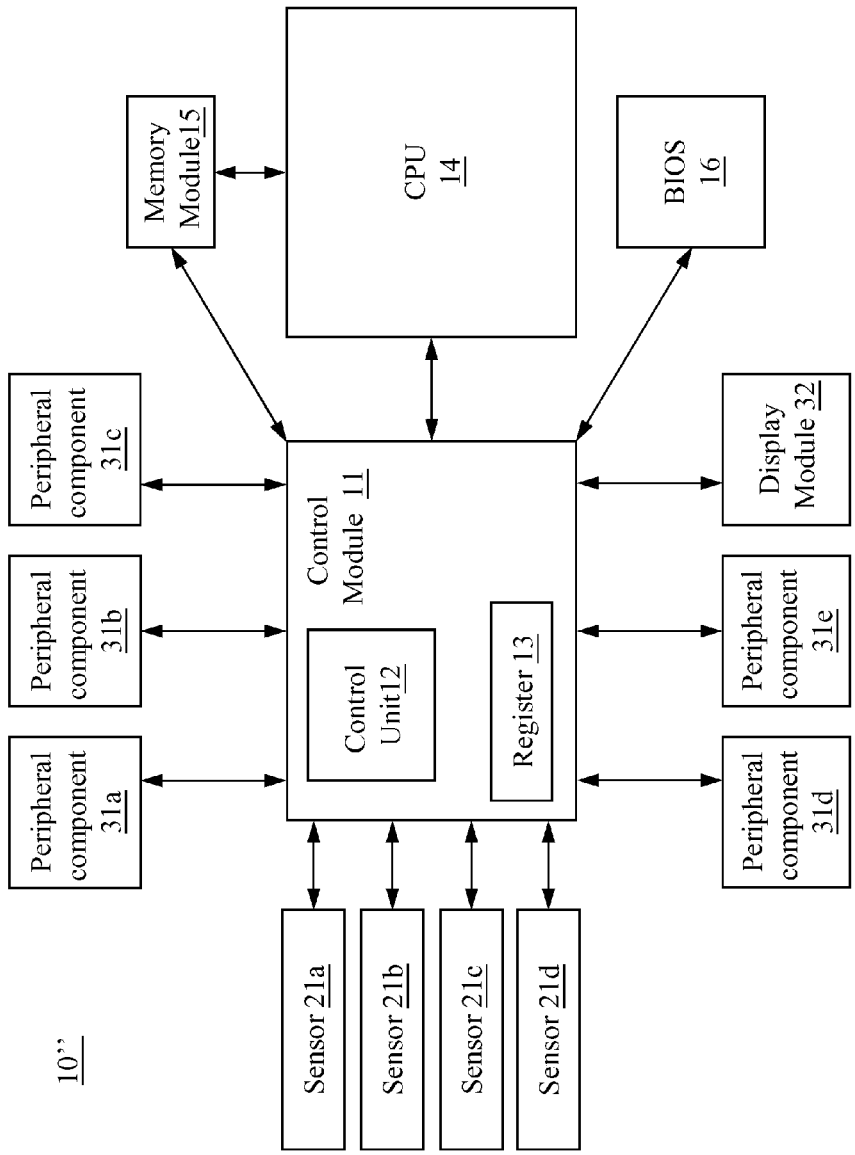
FIG. 5 is a schematic view of an electronic device according to third embodiment.

The following describes an electronic device having four sensors according to an embodiment. Please refer to FIG. 5, which is a schematic view of an electronic device according to third embodiment. The elements in FIG. 5 are the same as those in FIG. 3, so that the elements with the same symbols have the same functions or structures. For the sake of conciseness, only the differences are illustrated below, and the similar parts will not be repeated herein. The main difference between an electronic device 10" and the electronic device 10' is that the electronic device 10" further comprises a sensor 21c and a sensor 21d (for brief description, the sensors 21a, 21b, 21c, 21d are collectively referred to as sensors 21). Therefore, a control module 11 determines a state of the electronic device 10" according to four detecting signals transmitted from the four sensors 21 respectively. In this embodiment, the sensor 21a may be a pressure sensor, the sensor 21b may be a G-sensor, the sensor 21c may be a thermal sensor, and the sensor 21d may be a light sensor. The thermal sensor and the light sensor are disposed on a shell of the electronic device 10". The thermal sensor is used for measuring a temperature of a position where a user touches the electronic device 10" in normal operation. The light sensor is used for measuring luminous intensity of ambient light. In other embodiment, the sensors 21c, 21d may be the same type of the sensors but disposed at different position of the electronic device 10". For example, the sensors 21c, 21d may both be the pressure sensors. The sensor 21c is disposed at a front shell of the electronic device 10" and the sensor 21d is disposed at a back shell of the electronic device 10". When the user uses the electronic device 10" in a handheld way, the user's fingers press the sensors 21c, 21d at the same time. By disposing the multiple sensors 21 at different positions, the total number of situation modes of the electronic device is increased and the reliability of accidental-touch detection is increased, either. In other words, when a specific state detected by the sensor is not the real state of the electronic device 10", the unexpected state leads the electronic device 10" to change into an unexpected power supply arrangement. Therefore, by the increase in the number of the sensors 21, the problem of the unexpected power supply arrangement is solved.

Figure 6:
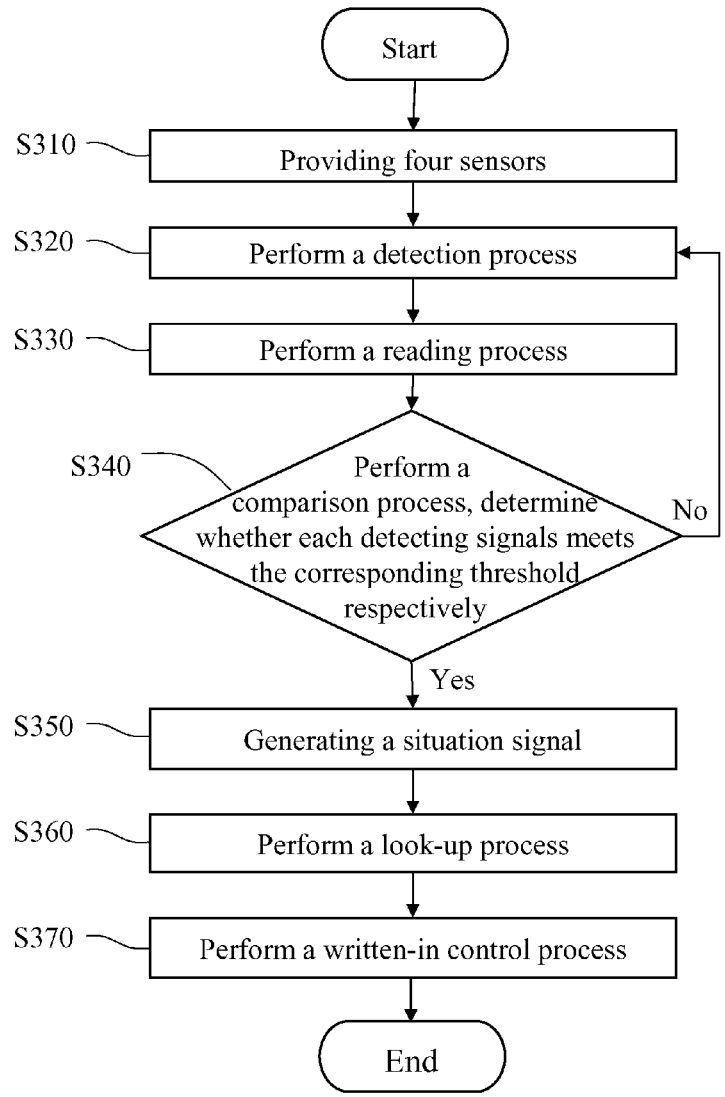
FIG. 6 is a first flow chart of a power management method of the electronic device according to third embodiment.

The following describes a power management method of an electronic device having four sensors. Please refer to FIG. 5 and FIG. 6, FIG. 6 is a first flow chart of a power management method of the electronic device according to third embodiment. First, four sensors 21 are provided in an electronic device 10" (Step 310). Then, a detection process is performed. When an original state is changed, the state is detected by the four sensors 21 together then the four sensors 21 generate a detecting signal respectively (Step 320). After that, a reading process is performed (Step 330). A control unit 12 reads four thresholds corresponding to the four sensors 21 respectively. Afterwards, a comparison process is performed. Compare the four detecting signals with the corresponding threshold respectively to determine whether each of the detecting signals meets the corresponding threshold at the same time (Step 340). When one of the detecting signals does not meet the corresponding threshold, return to the Step 320 and repeat the above-mentioned steps. When the fours detecting signals all meet the corresponding threshold respectively, a situation signal is generated (Step 350). Then, a look-up process is performed. A look-up table is looked up according to the situation signal for generating a control command (Step 360).

The content of each state of the corresponding look-up table looked up by the four sensors of the electronic device 10" is as shown in Table 3-1 below.

TABLE 3-1

|  | Handheld state | Still state | Off state |
| --- | --- | --- | --- |
| Pressure sensor (sensor 21a) | Point pressure generated | No pressure | No pressure |
| G-sensor (sensor 21b) | Movement in one direction | No acceleration | Continuous Movement |
| Thermal sensor (sensor 21c) | Temperature rising | No instant change | No instant change |
| Light sensor (sensor 21d) | No light | Having light | No definition |

As shown in Table 3-1, in a specific state (such as 'off state'), the situation signal of the sensor 21d may not be defined to prevent a determination paradox. In addition, in this embodiment, the G-sensor (the sensor 21b) may detect more than three kinds of states. Therefore, the number of the thresholds corresponding to the sensor 21b may be two. The detecting signals must meet the limitation of the two thresholds, so the control module 11 generates the situation signal. In this embodiment, after the control module 11 generates the control command, a written-in control process is performed. The control unit 12 of the control module 11 changes or maintains the power supply arrangement or the power management mode of a plurality of peripheral components 31, a display module 32 and a CPU 14 according to independent bits of a register 13 written by the control command (Step 370). In this embodiment, the brightness of the display module 32 and the frequency of the CPU 14 may be both adjusted according to the control command, referring to Table 2-2.

In the Step 370 of this embodiment, a reminding signal may be sent according to the control command. The reminding signal is displayed on the display module 32 for reminding a user that the situation mode of the electronic device 10" is about to be changed, thereby changing or maintaining the power supply arrangement of the peripheral components 31 or the power management mode of the display module 32 and that of the CPU 14. After that, the control module 11 receives a confirming message. The confirming message indicates that the user agrees with the change of the situation mode. Therefore, the control module 11 changes or maintains the independent bits for changing or maintaining the power supply arrangement of the peripheral component 31, the power management mode of the display module 32 or that of the CPU 14 according to the independent bits. When the user disagrees with the change of the situation mode, a refusing message is generated by the user. Then the electronic device 10" ignores the control command.

Figure 7:
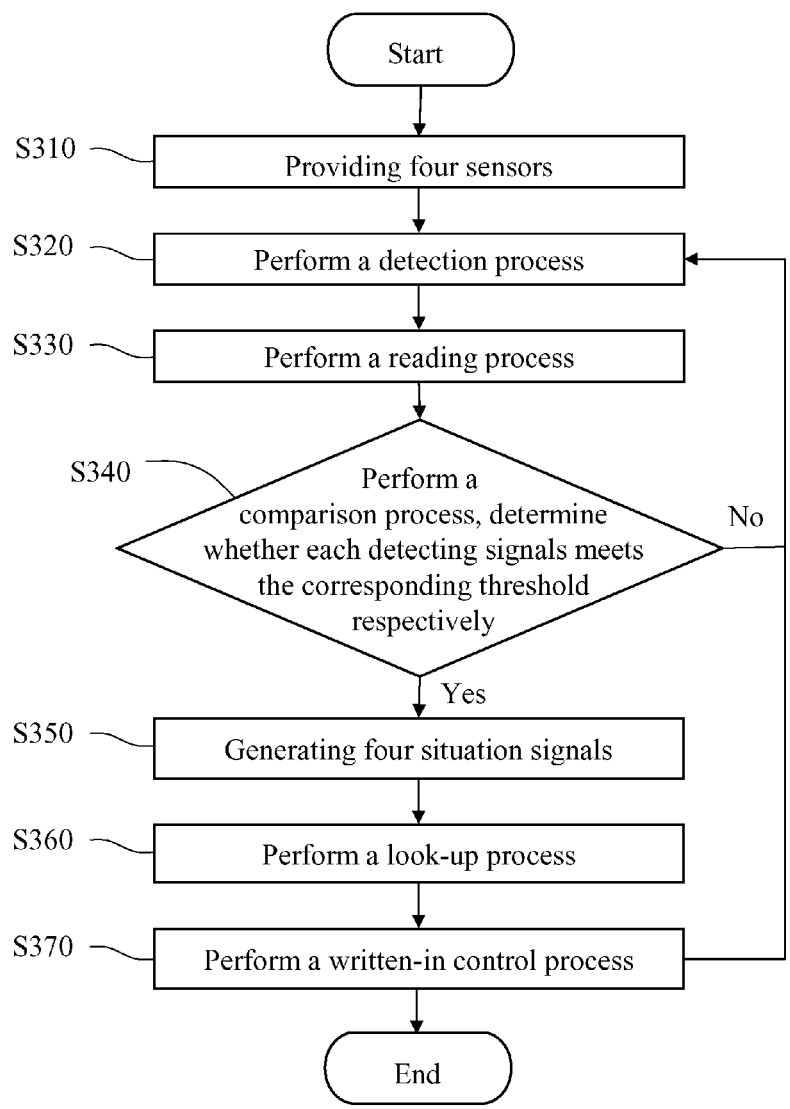
FIG. 7 is a second flow chart of the power management method of the electronic device according to third embodiment.

Otherwise, in some embodiments, after the Step 370 is performed, return to the Step 320 (as shown in FIG. 7, which is a second flow chart of the power management method of the electronic device according to third embodiment) and repeat the above-mentioned steps again.

Figure 8:
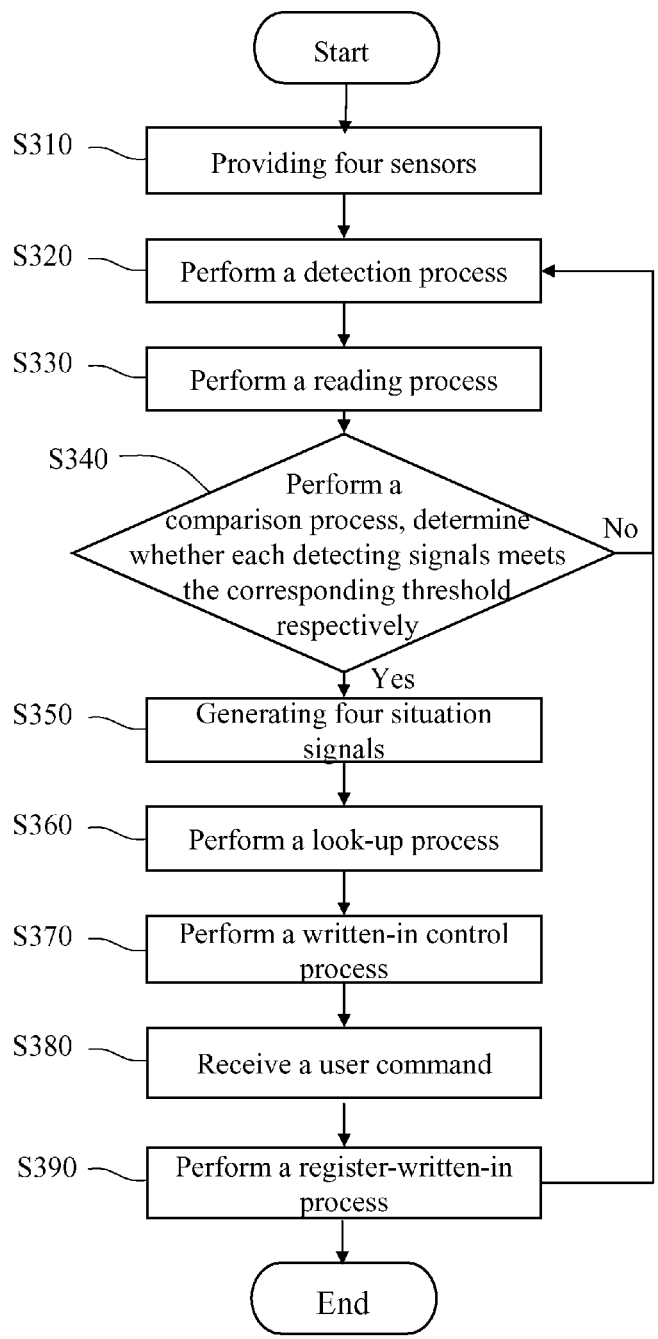
FIG. 8 is a third flow chart of the power management method of the electronic device according to third embodiment.

Please refer to FIG. 5 and FIG. 8, FIG. 8 is a third flow chart of the power management method of the electronic device according to third embodiment. In some embodiments, after the Step 370 is performed, the user may manually control the power supply arrangement of the peripheral components 31. The user inputs a user command, then, the control module 11 receives the user command and writes in the independent bits according to the user command (Step 380). A register-written-in process is performed. The power supply arrangement of the peripheral components 31, the power management mode of the display module 32 and that of the CPU 14 are changed or maintained according to the independent bits and the original control command is ignored (Step 390). That is to say, the user may interrupt the automatic control mechanism of the sensors 21 and switch the electronic device 10" to a user manual control. After that, when the control module 11 determines the situation mode is changed, the user manual control may be switched to the original automatic control mechanism of the power management method again. For example, when the electronic device 10" is in any one of the situation modes, the user may utilize a hot key function to compulsorily adjust the brightness of the display module 32. In other words, the automatic adjusting mode of the power management for the display module 32 is instantly replaced with a user setting mode.

Figure 9:
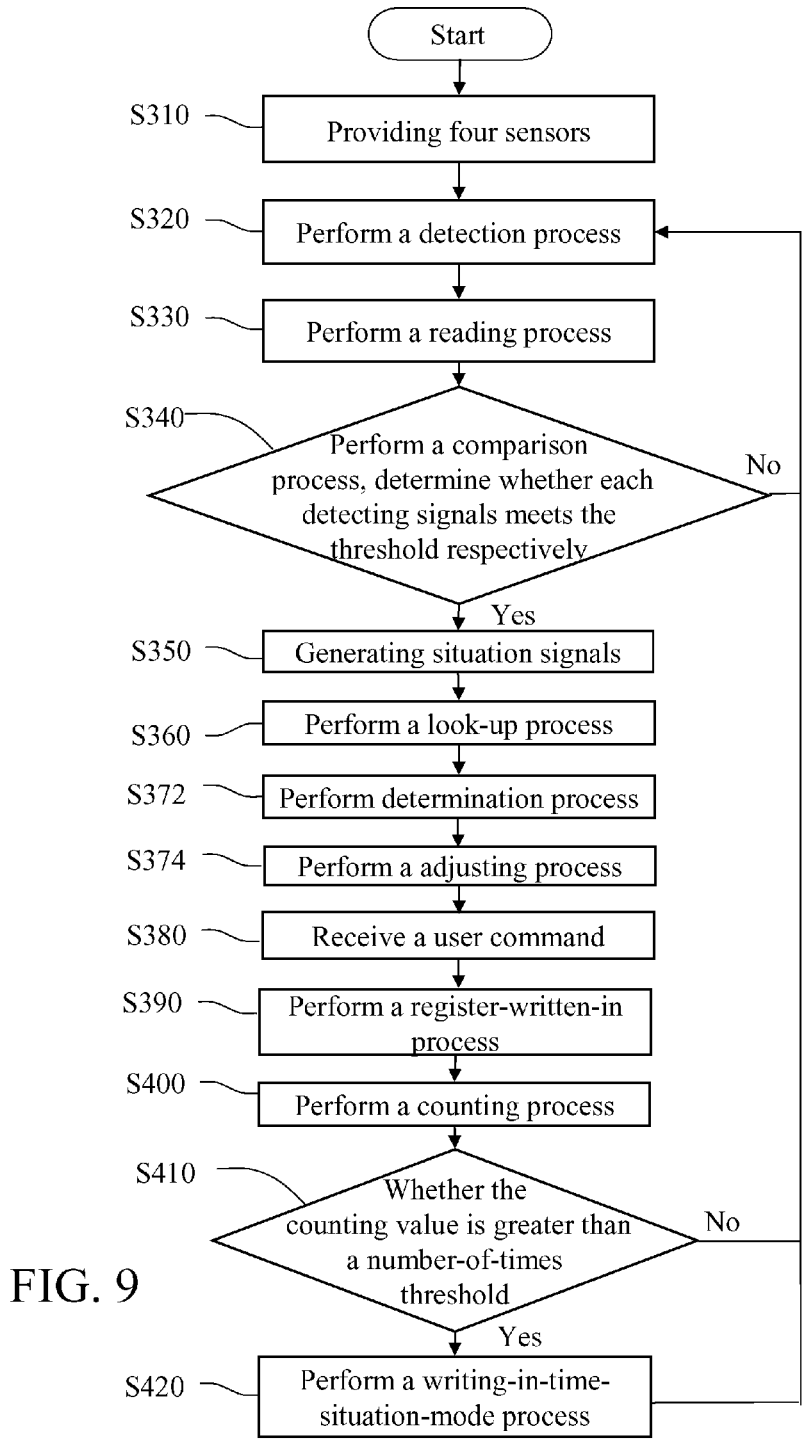
FIG. 9 is a fourth flow chart of the power management method of the electronic device according to third embodiment.

The following describes a power management method recording states of an electronic device intelligently. Please refer to FIG. 5 and FIG. 9, FIG. 9 is a fourth flow chart of the power management method of the electronic device according to third embodiment. In some embodiment, after the register-written-in process is performed, the electronic device 10" may perform a counting process. A counting value is generated according to a time parameter and a number of times of writing in the independent bits in response to the user command (Step 400). The time parameter means a specific period of time everyday, i.e. 10 am to 10:30 am everyday. For example, in the period of 10 am to 10:30 am everyday, the electronic device 10" generates a counting value according to a number of continuous days that a user compulsorily writes in the independent bits. After that, the counting value is compared with a number-of-times threshold (Step 410). For example, the number-of-times threshold may be three. When the counting value is greater than the number-of-times threshold (three), a writing-in-time-situation-mode process is performed. The time-situation mode of the look-up table is rewritten in (Step 420). Then, return to the Step 320 and repeat the above-mentioned steps. In one embodiment, the Step 370 further comprises the following steps: the control module 11 determines whether a time-situation mode of the look-up table meets the control command and the time parameter (Step 372). When the time-situation mode of the look-up table meets the control command and the time parameter at the same time, the control module 11 changes or maintains the power supply arrangement of the peripheral component 31 according to the time-situation mode (Step 374). That is to say, the control module 11 may adjust the power management method intelligently with the time parameter.

For example, the electronic device 10" is set in the 'still situation mode' and the peripheral component 31a is in the 'shut down' mode at first time. In the period of 10 am to 10:30 am in first day, the user sets the peripheral component 31a from the 'shut down' mode to the 'power on' mode. Then, in the same period of time (10 am to 10:30 am) on second, third and fourth day, the user sets the peripheral component 31a from the 'shut down' mode to the 'power on' mode, so the control module 11 writes in the time-situation mode of the look-up table according to the time parameter and the number of times of the control commands generated. In the period of 10 am to 10:30 am in fifth day, when the electronic device 10" is in the 'still situation mode' again, the control module 11 determines whether the time-situation mode of the look-up table meets the control command and the time parameter. When the control command and the time parameter both meet the time-situation mode, the peripheral component is turned on automatically until the corresponding situation mode is changed. When the control command and the time parameter do not meet the time-situation mode, the power supply arrangement of the peripheral components 31a is adjusted according to the original control command and the counting value is back to zero.

Figure 10:
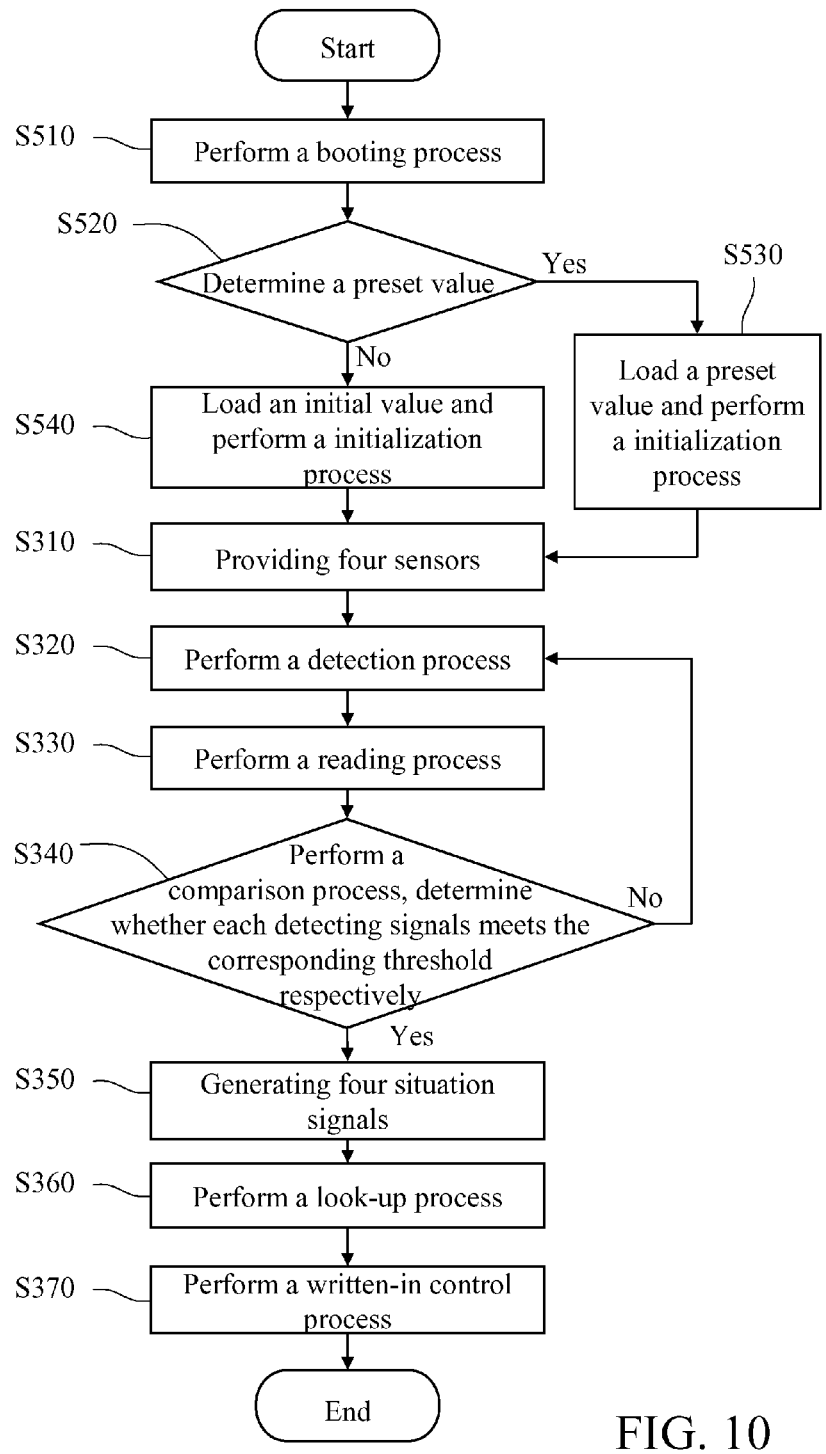
FIG. 10 is a fifth flow chart of the power management method of the electronic device according to third embodiment.

The following describes a power management method and apparatus thereof in one embodiment. Please refer to FIG. 5 and FIG. 10, wherein FIG. 10 is a fifth flow chart of the power management method of the electronic device according to third embodiment. First, a booting process is performed in connection with the electronic device 10" (Step 510). Whether there is a preset value is then determined (Step 520). When the determination shows that there is a preset value, the preset value is loaded and an initialization process is performed (Step 530), and the electronic device 10" is initialized by the 10 BIOS 23. Then, an operation system is entered and an operation mode is executed. After that, repeat the above-mentioned Step 310 to Step 370 in order. The preset value may be the corresponding preset value of the last mode the electronic device 10" was in or the corresponding preset value of the user defined mode. The preset value was saved in the memory module 15 in advance.

When the determination shows that there is no preset value, an initial value of the electronic device 10" is loaded from the BIOS 23 before the initialization process is performed (Step 540). The electronic device 10" is initialized by the BIOS 23. Then, the operation system is entered and the operation mode is executed. Next, repeat the above-mentioned Step 310 to Step 370 in order. The initial value is from a setting of the BIOS 23.

Figure 11:
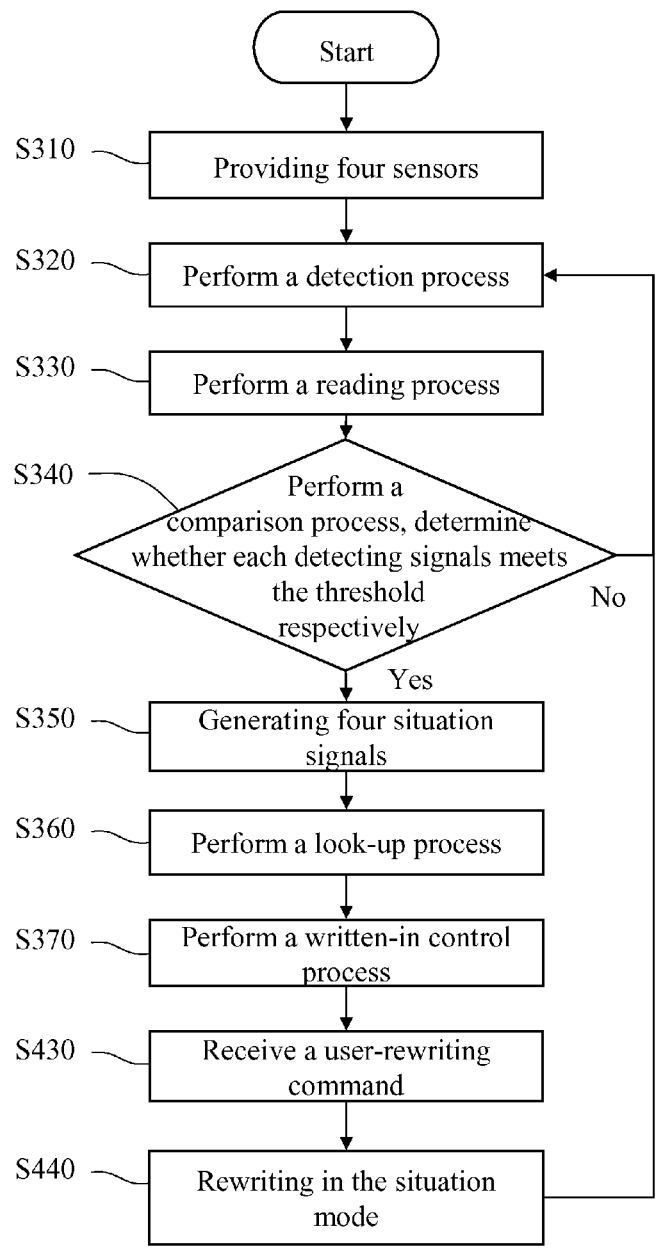
FIG. 11 is a sixth flow chart of the power management method of the electronic device according to third embodiment.

The following describes a setting method that the user may manually rewrite the situation mode. Please refer to FIG. 5 and FIG. 11, FIG. 11 is a sixth flow chart of the power management method of the electronic device according to third embodiment. In another embodiment, after the Step 370 is performed, a user-rewriting command is sent by a user, the electronic device 10" receives the user-rewriting command (Step 430). A setting of the situation mode of the look-up table is changed according to the user-rewriting command (Step 440). After that, repeat the above-mentioned Step 320 to Step 370. In the Step 370, when the situation signal meets the situation mode of the look-up table, the control command is generated. For example, the user may set the brightness value of the display module 32 in the 'handheld situation mode' as '1' and that of the display module 32 in the 'still situation mode' as '2'. Next, when the control module 11 determines that the electronic device 10" is in the 'handheld situation mode', the brightness of the display module 32 in the 'handheld situation mode' is adjusted to 'brightness 1'. When the control module 11 determines that the electronic device 10" is in the 'still situation mode', the brightness of the display module 32 in the 'still situation mode' is adjusted to 'brightness 2'.

To sum up, the embodiment discloses a method and apparatus for power management having the sensor. The power supply arrangement of the peripheral component and that of other electronic component are adjusted automatically according to the sensor detecting the state. Therefore, the problem that a conventional power supply arrangement of a peripheral component and an electronic component of an electronic device may not be changed automatically and power energy wasted is solved. At the same time, the power management method may be effectively performed by the state detection of the multiple sensors and the situation mode determination of the control module. Otherwise, the detection of the multiple sensors may prevent the wrong determination resulting from accidental touch or misjudgment of the sensors. Therefore, the method and apparatus for power management of the embodiment achieves the effects of the automatic control with humanity, misjudgment prevented and power saving.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A power management method, for setting a power supply arrangement of an electronic device intelligently, comprising:
    providing at least two sensors, the at least two sensors configured to detect two different physical properties, wherein each physical property corresponds to a state of the electronic device;
    generating a detecting signal respectively by each of the at least two detecting sensors according to the detected state of the electronic device;
    respectively comparing each of the detecting signals with at least one corresponding threshold and generating a respective situation signal when the detecting signal meets the at least one corresponding threshold;
    looking up a look-up table according to the situation signals to determine a situation mode selected from a predetermined plurality of situation modes, wherein the situation modes represent different kinds of external environmental conditions according to the interaction between the electronic device and a user;
    looking up a look-up table according to the situation mode for generating a control command; and
    writing in at least one independent bit of a register according to the control command for changing or maintaining a power supply arrangement of at least one peripheral component;
    wherein the situation modes comprise an off mode in which the electronic device is not in use, a still mode in which the electronic device is in use while disposed on a support surface, and a handheld mode in which the electronic device is in use in a handheld manner; and
    wherein the step of writing in the at least one independent bit of the register according to the control command for changing or maintaining the power supply arrangement of the at least one peripheral component comprises:
        sending a reminding signal according to the control command; and
        receiving a confirming message for changing or maintaining the at least one independent bit and changing or maintaining the power supply arrangement of the at least one peripheral component according to the at least one independent bit.

2. The power management method according to claim 1, further comprises:
    adjusting a brightness of a display module according to the control command.

3. The power management method according to claim 1, further comprises:
    adjusting a frequency of a processor according to the control command.

4. The power management method according to claim 1, further comprises:
    writing in the at least one independent bit according to a user command; and
    changing or maintaining the power supply arrangement of the at least one peripheral component according to the at least one independent bit and ignoring the control command.

5. The power management method according to claim 4, further comprises:
    generating a counting value according to a time parameter and a number of times of writing in the at least one independent bit in response to the user command; and
    comparing the counting value with a number-of-times threshold; and
    writing in a time-situation mode of the look-up table when the counting value is greater than the number-of-times threshold;
    wherein the step of writing in the at least one independent bit of the register according to the control command for changing or maintaining the power supply arrangement of the at least one peripheral component further comprises:
    determining whether the time-situation mode of the look-up table meets the control command and the time parameter; and
    changing or maintaining the power supply arrangement of the at least one peripheral component according to the time-situation mode.

6. An electronic device comprising:
    at least two sensors, each of the at least two sensors configured to detect two different physical properties and generate a respective detection signal
    at least one peripheral component; and
    a control module, electrically connected to the at least one peripheral component and the at least two sensors, wherein the control module comprises a register, the control module is configured to compare each of the detecting signals with at least one corresponding threshold and generate a respective situation signal when the detecting signal meets the at least one corresponding threshold, look up a look-up table according to the situation signals to determine a situation mode selected from a predetermined plurality of situation modes, wherein the situation modes represent different kinds of external environmental conditions according to the interaction between the electronic device and a user, look up a look-up table according to the situation mode for generating a control command, send a reminding signal according to the control command, receive a confirming message for changing or maintaining at least one independent bit of the register and changing or maintaining the power supply arrangement of the at least one peripheral component according to the at least one independent bit, and write in the at least one independent bit of the register according to the confirming message for changing or maintaining a power supply arrangement of the at least one peripheral component;

wherein the situation modes comprise an off mode in which the electronic device is not in use, a still mode in which the electronic device is in use while disposed on a support surface, and a handheld mode in which the electronic device is in use in a handheld manner.

7. The electronic device according to claim 6, further comprises a display module and a processor, wherein the control module adjusts a brightness of the display module and a frequency of the processor according to the control command.

8. The electronic device according to claim 6, wherein the power supply arrangement of the at least one peripheral component corresponds to the at least one independent bit of the register respectively.

9. The electronic device according to claim 6, wherein, the control module is configured to adjust the power supply arrangement of the at least one peripheral component according to a change in the situation mode.

10. The electronic device according to claim 6, wherein in the control module is configured such that when the electronic device receives a user command for changing the power supply arrangement of the at least one peripheral component, the control module directly changes the power supply arrangement of the at least one peripheral component according to the user command and ignores the control command.

11. The electronic device having the at least two sensors according to claim 6, wherein the at least one peripheral component comprises a web camera module, an internal local area network, a wireless local area network, a touch panel module, a heat dissipation module, a processor frequency control module, an audio module, an audio input module, a bluetooth module and an interface connector.

12. The power management method according to claim 1, wherein the at least two sensors comprise a motion sensor and a pressure sensor.

13. The electronic device according to claim 6, wherein the at least two sensors comprise a motion sensor and a pressure sensor.

14. The electronic device according to claim 13, further comprising a thermal sensor and a light sensor.

* * * * *